Feb. 19, 1952     C. R. BINGHAM     2,586,202
TRAILER HITCH
Filed April 20, 1950

INVENTOR.
Charles Russell Bingham
BY
Bush & Bush
Attorneys.

Patented Feb. 19, 1952

2,586,202

UNITED STATES PATENT OFFICE 2,586,202

TRAILER HITCH

Charles Russell Bingham, Davenport, Iowa

Application April 20, 1950, Serial No. 157,112

11 Claims. (Cl. 280—33.44)

My invention relates to trailer hitches and the objects of my invention are to provide means by which a trailer may be securely hitched to an automobile or tractor in such a way as to reduce or avoid a large part of the bobbing up and down movement of the front end of the trailer when hitched to the bumper or extreme rear of the frame of an automobile; to provide means which will exert the forward pull upon a trailer from a point close to the middle of the rear axle of an automobile drawing same and at the same time guide the trailer from a point at the middle of the extreme rear of the automobile frame or rear bumper; to provide means which will facilitate proper turning of the trailer in going around curves and similar movements.

I accomplish these objects by the means illustrated in the accompanying drawings, in which—

Similar numerals refer to similar parts throughout the several views.

Figure 1:
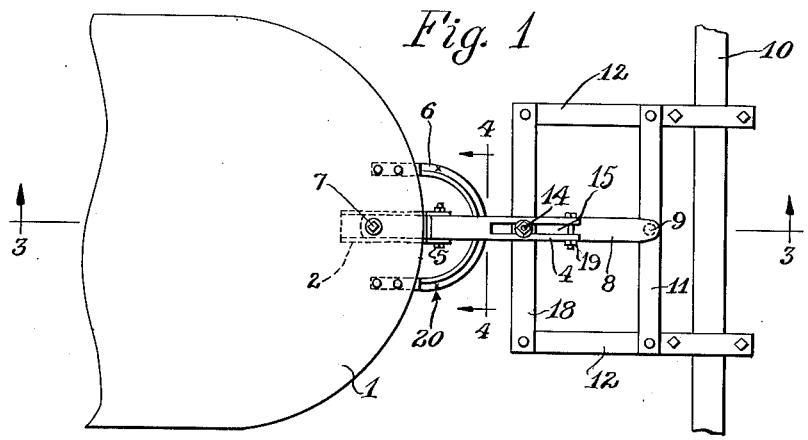
Figure 1 is a plan view of my apparatus showing a portion of a trailer hitched to the draft frame of an automobile in direct line.
Figure 4:
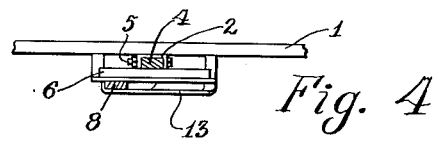
Figure 4 is a sectional view on the line 4—4 of Figure 1.
Figure 3:
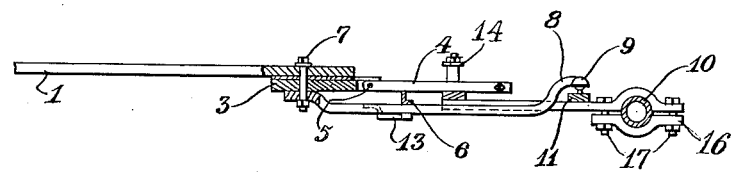
Figure 3 is a sectional view on the line 3—3 of Figure 1.
Figure 2:
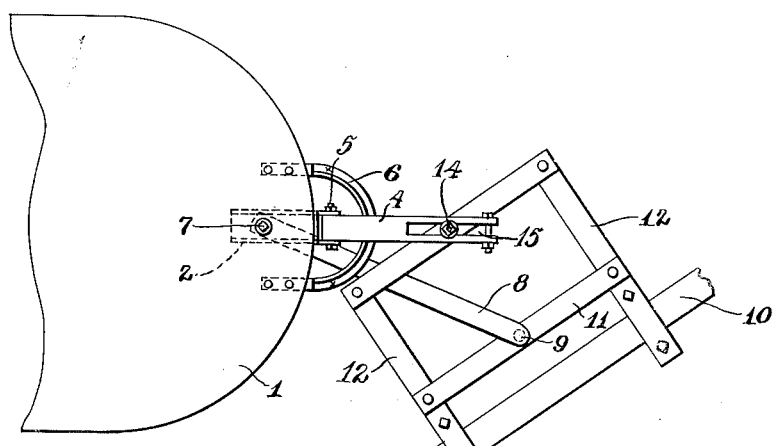
Figure 2 is a similar view showing the automobile turning at an angle to the trailer.

My apparatus includes a crossbar 11 in close proximity to the rear axle 10 of an automobile with a long reach 8 having its front end united to the cross-bar 11 by a ball and socket joint 9, and its rear end pivotally secured to the bed or bottom of a trailer by a vertical pivot bolt 7.

A channel bar 2 may be rigidly united to the bottom of the trailer by the pivot bolt 7 and a filler 3 may be inserted between the extending flanges of the channel bar 2, or the reach may be pivoted directly to the bed or bed frame of the trailer.

A semi-circular bracing and supporting member 6 has its open ends bolted to the bed 1 of the trailer or otherwise suitably secured thereto and extends forwardly in a semi-circle just above the reach 8.

An auxiliary supporting member 13 has its ends suitably welded at 20 or otherwise united to the member 6 near the rear end thereof and follows the curve of the member 6. The member 13 forms a rest for the reach 8 and acts to prevent downward movement of the adjacent portion of the reach 8 and upward movement of the front end of the trailer 1.

A guide bar 4 has its rear end formed into a hinge member which is secured between the flanges of the channel 2 by a pivot bolt 5. The front end of the guide bar 4 is formed with a slot 15 which embraces a vertical pivot bolt 14. The pivot bolt 14 is secured in the middle of the rear crossbar 18 of the frame 12 and extends above the guide bar 4 so as to allow some vertical movement of the front end of the guide bar 4 upon its pivot 5 with sufficient play to allow lateral inclination of the trailer relative to the tractor.

A bolt 19 is secured in the front end of the guide bar 4 to prevent the guide bar's being withdrawn from the bolt 14.

The supporting member 6 and the auxiliary member 13, preferably of angle or channel iron, may be made of any other suitable form or material of sufficient size, shape and strength to stand the road shocks of the vehicles, and if desired, may be reenforced by additional braces or other means.

In the operation of this device the crossbar 11 may be secured to the axle by any desired means, but I have shown a pair of sidebars 12 having their front ends secured to the axle 10 by a plate 16 and bolts 17 and the rear ends of the bars 12 are united by a crossbar 18. The front end of the reach 8 is detachably mounted upon the crossbar 11 by the ball and socket joint 9 which may be of any of the forms in common use.

As the automobile with the axle 10 is driven forward, the reach 8 pulls the trailer along with it and if going in a straight line, the trailer will follow directly in line with the reach 8. In turning a corner, the front end of the reach 8 will be carried laterally by the joint 9 while the guide bar 4 will continue to extend forwardly along the middle line of the trailer and will cause the trailer to turn so as to follow the automobile.

My device is intended primarily for trailers supported upon a single pair of wheels, but could be adapted to a four-wheeled trailer by having the guide bar 4 united to the tongue of the trailer so as to turn the front wheels of the trailer as the automobile turns.

For convenience, in the claims I refer to the automobile to which the trailer is assumed to be attached as the tractor.

Various changes may be made in the form and arrangement of the parts without departing from the spirit of my invention and I do not limit my claims to the precise forms shown in the drawings.

I claim:

1. A trailer hitch including a reach bar having its rear end pivotally united to the floor or bed of the trailer and its front end united by a ball and socket joint to the tractor close to and at the middle of the rear axle of the tractor, a channel bar united to the bed of the trailer, a guide bar having its rear end pivoted by a hinge joint to the channel bar and its front end having a longitudinal slot formed therein to embrace a vertical pivot bolt mounted in a crossbar carried by the tractor at the rear end thereof.

2. A trailer hitch as described in claim 1, and a semi-circular brace bar having its ends rigidly united to the trailer bed and its intermediate portion extending forwardly in a semi-circle from the trailer and arranged to contact the reach bar to restrain or limit downward movement of the front end of the trailer.

3. A trailer hitch as described in claim 1, and a semi-circular brace bar having its ends rigidly united to the trailer bed and its intermediate portion extending forwardly in a semi-circle from the trailer and arranged to contact the reach bar to restrain or limit downward movement of the front end of the trailer, and a supporting bar with its ends united to the brace bar and the portion intermediate the ends spaced from the brace bar to permit free lateral movement of the reach between the brace bar and the supporting bar and to support the reach against downward movement relative to the brace bar.

4. In a trailer hitch, means to limit the vertical movement of the front end of the trailer when passing over rough or uneven roads, including a reach bar having its rear end united to the trailer by a vertical pivot and its front end united by a ball and socket joint to the tractor close to and at the middle of the rear axle of the tractor, a channel bar united to the bed of the trailer, a guide bar having its rear end pivoted by a hinge joint to the channel bar and its front end having a longitudinal slot formed therein to embrace a vertical pivot bolt mounted in a crossbar carried by the tractor at the rear end thereof.

5. In a trailer hitch, means to limit the vertical movement of the front end of the trailer when passing over rough or uneven roads, including a reach bar having its rear end united to the trailer by a vertical pivot and its front end united by a ball and socket joint to the tractor close to and at the middle of the rear axle of the tractor, a channel bar united to the bed of the trailer, a guide bar having its rear end pivoted by a hinge joint to the channel bar and its front end having a longitudinal slot formed therein to embrace a vertical pivot bolt mounted in a crossbar carried by the tractor at the rear end thereof, a brace bar united to the trailer and extending forwardly therefrom, and a supporting bar with its ends united to the brace bar and the portion intermediate the ends spaced from the brace bar to permit free lateral movement of the reach between the brace bar and the supporting bar and to support the reach against downward movement relative to the brace bar.

6. In a trailer hitch, the combination with a reach bar having its rear end pivotally united to the floor or bed of the trailer by a vertical pivot and its front end united by a ball and socket joint close to and midway of the rear axle of the tractor, and a guide bar having its rear end connected by a horizontal hinge joint to the trailer and its front end having a longitudinal slot formed therein to embrace an extended vertical pivot bolt mounted in a crossbar united to the tractor at the rear end thereof.

7. The combination as described in claim 6, and a semi-circular brace bar having its ends rigidly united to the trailer bed and its intermediate portion extending forwardly in a semi-circle from the trailer and arranged to contact and rest upon the reach bar to restrain or limit the front end of the trailer from downward movement.

8. The combination as described in claim 6, and a semi-circular brace bar having its ends rigidly united to the trailer bed and its intermediate portion extending forwardly in a semi-circle from the trailer and arranged to contact and rest upon the reach bar to restrain or limit the front end of the trailer from downward movement, and a supporting bar with its ends united to the brace bar and the portion intermediate the ends spaced from the brace bar to permit free lateral movement of the reach between the brace bar and the supporting bar and to support the reach against downward movement relative to the brace bar.

9. In a trailer hitch, the combination with a reach bar having its rear end pivotally united to the floor or bed of the trailer and its front end united by a ball and socket joint to the tractor close to and at the middle of the rear axle of the tractor, of a longitudinal bar united to the bed of the trailer, and a guide bar having its rear end pivoted by a hinge joint to the longitudinal bar and its front end having a longitudinal slot formed therein to embrace a vertical pivot bolt united to the tractor at the rear end thereof.

10. The combination as described in claim 9, said pivot bolt and slot being arranged to permit lateral tilting of the trailer relative to the tractor.

11. The combination as described in claim 9, said pivot bolt and slot being arranged to permit lateral tilting of the trailer relative to the tractor, and means to prevent accidental displacement of the guide bar from its vertical pivot bolt.

CHARLES RUSSELL BINGHAM.

REFERENCES CITED

The following references are of record in the file of this patent:

UNITED STATES PATENTS

| Number | Name | Date |
|---|---|---|
| 1,389,840 | Neely | Sept. 6, 1921 |
| 1,714,354 | Ely | May 21, 1929 |
| 2,133,202 | Lantz | Oct. 11, 1938 |